(12) United States Patent
Shaw et al.

(10) Patent No.: US 8,690,462 B2
(45) Date of Patent: Apr. 8, 2014

(54) FLEXIBLE GEAR RACK CARRIAGE TRANSPORT IN A PRINTING APPARATUS

(75) Inventors: Timothy Carlyle Shaw, Sammamish, WA (US); Jamie Kelso, Portland, OR (US); David W. Johnson, Tigard, OR (US)

(73) Assignee: Xerox Corporation, Norwalk, CT (US)

( * ) Notice: Subject to any disclaimer, the term of this patent is extended or adjusted under 35 U.S.C. 154(b) by 64 days.

(21) Appl. No.: 13/330,249

(22) Filed: Dec. 19, 2011

(65) Prior Publication Data

US 2013/0156481 A1 Jun. 20, 2013

(51) Int. Cl.
*B41J 19/00* (2006.01)

(52) U.S. Cl.
USPC .......................................... 400/283; 74/89.18

(58) Field of Classification Search
CPC ..... F16H 19/003; F16H 19/001; F16H 19/00; F16H 19/005; F16H 19/04; A63H 29/24
USPC ................................. 400/283; 74/89.17, 89.18
See application file for complete search history.

(56) References Cited

U.S. PATENT DOCUMENTS

| | | | |
|---|---|---|---|
| 2,941,413 A * | 6/1960 | Huber et al. ................... | 474/250 |
| 3,737,024 A | 6/1973 | Gelzer | |
| 3,769,850 A * | 11/1973 | Culligan .......................... | 74/462 |
| 3,932,957 A | 1/1976 | Morrison et al. | |
| 4,083,327 A | 4/1978 | Dowdy | |
| 4,482,002 A | 11/1984 | Reuter | |
| 4,570,542 A | 2/1986 | Cable et al. | |
| 4,571,212 A | 2/1986 | Kakizaki | |
| 4,711,346 A | 12/1987 | Breher et al. | |
| 4,831,777 A * | 5/1989 | Johnson, Jr. ...................... | 49/55 |
| 5,013,286 A | 5/1991 | Breher | |
| 5,070,792 A | 12/1991 | Harris | |
| 5,150,631 A * | 9/1992 | Faerber et al. .................. | 74/422 |
| 5,224,410 A | 7/1993 | Graichen et al. | |
| 5,455,609 A * | 10/1995 | Gast et al. ........................ | 347/32 |
| 5,774,139 A | 6/1998 | Salzer et al. | |
| 5,921,379 A | 7/1999 | Horton | |
| 5,980,018 A | 11/1999 | Taylor et al. | |
| 6,132,026 A * | 10/2000 | Taylor et al. .................... | 347/32 |
| 6,494,307 B1 | 12/2002 | Kozak et al. | |
| 6,520,620 B1 | 2/2003 | Askren et al. | |
| 6,543,602 B1 | 4/2003 | Bonnet | |
| 6,553,744 B1 | 4/2003 | Terminella et al. | |
| 6,580,444 B1 | 6/2003 | Drynkin et al. | |
| 6,910,397 B2 * | 6/2005 | Schapiro et al. ............. | 74/89.18 |
| 7,051,870 B2 | 5/2006 | Schoendienst et al. | |
| 7,780,162 B2 * | 8/2010 | Kaneko et al. ................. | 271/171 |

(Continued)

FOREIGN PATENT DOCUMENTS

| | | | |
|---|---|---|---|
| JP | 61010155 A * | 1/1986 | |
| JP | 09014375 A * | 1/1997 | |
| JP | 09210169 A * | 8/1997 | |

*Primary Examiner* — Matthew G Marini
*Assistant Examiner* — John M Royston
(74) *Attorney, Agent, or Firm* — Maginot, Moore & Beck, LLP

(57) ABSTRACT

A durable gear strap couples components in an imaging device to a driving force. The gear strap includes a strip having a plurality of rigid sections and a plurality of flexible sections. Gear teeth on the strip enable rotation of a gear to move the gear strap in a track. At least one engagement member extends from one of the rigid sections to couple a component to the gear strap for movement.

13 Claims, 5 Drawing Sheets

(56) References Cited

U.S. PATENT DOCUMENTS

| | | |
|---|---|---|
| 7,836,786 B2 | 11/2010 | Zhang et al. |
| 7,895,930 B2 | 3/2011 | Fisk et al. |
| 7,942,463 B2 | 5/2011 | Starzmann et al. |
| 7,954,815 B2 | 6/2011 | Bober et al. |
| 2003/0136647 A1 | 7/2003 | Knott et al. |
| 2004/0239720 A1 | 12/2004 | Clarke et al. |
| 2007/0126783 A1 | 6/2007 | Deshon-Stepp et al. |
| 2008/0050163 A1 | 2/2008 | Malone et al. |
| 2009/0301237 A1 | 12/2009 | Everman |

* cited by examiner

FLEXIBLE GEAR RACK CARRIAGE TRANSPORT IN A PRINTING APPARATUS

TECHNICAL FIELD

This disclosure relates generally to mechanical assemblies that drive components in a device and, more particularly, to mechanical assemblies that drive components in a printer.

BACKGROUND

Many mechanical assemblies drive one or more components between various locations within an imaging device during operation. One such device is a printer maintenance unit. During imaging operations, a printer operates one or more printheads, each of which includes a plurality of ink ejectors that eject ink to form ink images on an image receiving member, such as a rotatable drum or belt, or on print media, such as paper. At various times, the printer performs maintenance to clean debris from one or more printheads to maintain the operation of the ink ejectors in the printheads.

To perform the printhead maintenance operation properly, one or more of the printheads and/or the printhead maintenance unit move inside the printer. In one embodiment, the printheads move away from a print medium to provide a path for the printhead maintenance unit to slide between the printheads and the print medium. After the maintenance operation is performed, the printheads return to the position at which they are operated to form ink images on the print medium. Within the printhead maintenance unit, various components, including wipers that clean the printheads, move into engagement with the printheads to clean the printheads.

Existing printhead maintenance units move components into and out of engagement with the printheads using endless drive belts that engage one or more components, such as wiper assemblies. A flexible material, such as rubber, forms the drive belt and one or more carrier tabs are attached to the belt to enable various maintenance unit components to be coupled to the belt. Metal or a resilient plastic affixed to the flexible belt generally forms the carrier tabs. In some situations, a flexible drive belt may distort while driving components of a printhead maintenance unit. Thus, improvements to drive assemblies that enable improved operation with moveable components in printhead maintenance units and other mechanical devices would be beneficial.

SUMMARY

In one embodiment, a gear strap for use in a printing device has been developed. The gear strap includes a strip having a plurality of rigid sections interspersed with a plurality of flexible sections formed from essentially one material, the rigid sections being thicker in cross-section than the flexible sections to enable the flexible sections to bend, a plurality of teeth formed on the rigid sections and the flexible sections of the strip, the plurality of teeth being configured to engage a gear to enable the gear to move the strip in response to rotation of the gear, and at least one engagement member extending from one of the plurality of rigid sections of the strip, the engagement member being configured to receive a coupling member to enable the one rigid section to move the coupling member in response to movement of the strip.

In another embodiment, a printing apparatus has been developed. The printing apparatus includes a support plate, a track positioned in the support plate, the track having a first wall and a second wall, a gear positioned on the support plate proximate to one side of the track, and a gear strap positioned in the track between the first wall and the second wall. The gear strap includes a strip having a plurality of rigid sections interspersed with a plurality of flexible sections formed from essentially one material, the rigid sections being thicker in cross-section than the flexible sections to enable the flexible sections to bend, a plurality of teeth formed on the rigid sections and the flexible sections of the continuous strip, the plurality of teeth being configured to engage the gear to enable rotation of the gear to move the continuous strip in the track, and at least one engagement member extending from one of the plurality of rigid sections of the strip, the engagement member being configured to receive a coupling member to enable the one rigid section to move the coupling member in response to movement of the strip.

BRIEF DESCRIPTION OF THE DRAWINGS

FIG. 3.

DETAILED DESCRIPTION

Figure 1:
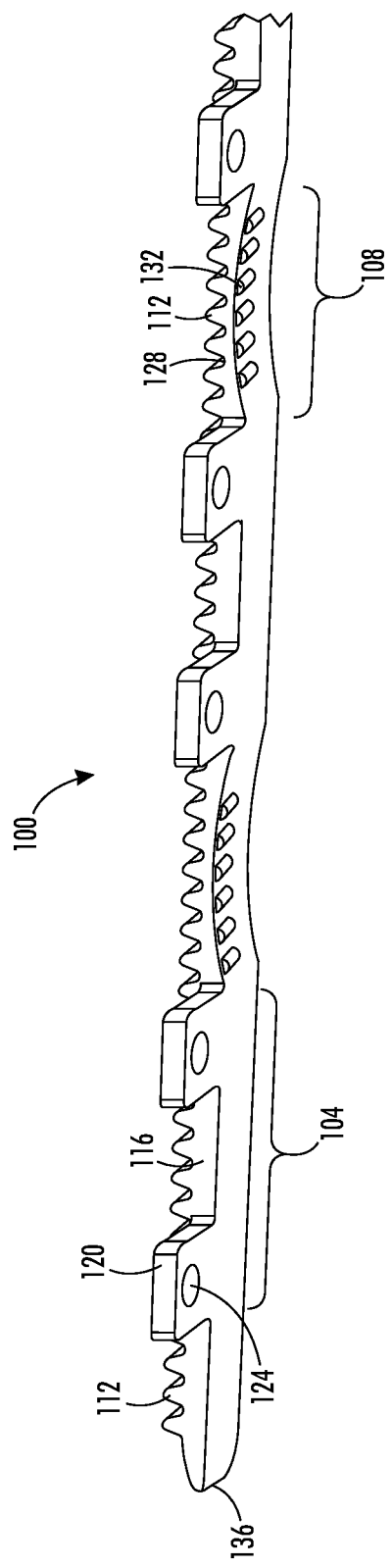
FIG. 1 is a perspective view of a gear strap.

For a general understanding of the environment for the apparatus and method disclosed herein as well as the details for the apparatus and method, reference is made to the drawings. In the drawings, like reference numerals designate like elements. In this document, the term "printer" refers to any device that is configured to form ink images on a print medium. An image receiving member refers to a member that receives ink drops, such as an imaging drum, imaging belt, or various print media including paper.

As used herein, the terms "thermoplastic" and "thermoplastic polymer" are interchangeable and refer to any polymeric material that is liquid above a melting temperature and solid below the melting temperature. Common examples of thermoplastics include polypropylene and polyamides. Various techniques including injection molding enable a single thermoplastic member to be formed in a wide variety of shapes and structures.

As used herein, the term "carriage member" refers to any member that translates the motion of a moving drive member into motion of an object that is mechanically coupled to the carriage member. In one example depicted in more detail below, a moving drive member is a rotating toothed gear and a carriage member is a thermoplastic gear strap with teeth that engage the rotating gear. The gear strap is coupled to one or more printhead maintenance devices and the rotation of the gear moves the gear strap and printhead maintenance devices between two positions in the printer.

FIG. 1 depicts a carriage member 100 exemplified as a gear strap formed from a continuous strip of thermoplastic material. As used in this document, the word "strip" means a piece of material that is longer than it is wide and has a thickness that is less than the length or the width of the material. The carriage member 100 includes a plurality of rigid sections 104 and flexible sections 108. As used herein, the term "section" in the context of a gear strap formed from a continuous strip refers to a segment of the carriage member positioned next to one or two transitions in the thickness of the material forming the strip. For example, the rigid sections 104 each have a substantially uniform thickness, and each rigid section 104 is positioned next to one or two of the flexible sections 108 that taper to a smaller thickness. In the embodiment of FIG. 1, the thickness of the thermoplastic in the strip forming the gear strap in carriage member 100 varies between the rigid sections 104 and the flexible sections 108, but multiple rigid sections 104 and flexible sections 108 are formed as a single gear strap member using injection molding or other fabrication methods known to the art. In other embodiments, multiple sections of a gear strap are joined together to form a single carriage member.

Some or all of the rigid sections 104 include one or more engagement members 120 that enable the carriage member 100 to mechanically couple to a device in the printer such as a printhead maintenance device. In the embodiment of FIG. 1, each engagement member 120 includes a through-hole 124 that engages a screw or pin in a corresponding mechanical coupling member of the printhead maintenance device. Each rigid section 104 is formed with thermoplastic 116 to have a thickness that enables the rigid section 104 to remain substantially straight during operation.

Each flexible section 108 is formed with a thermoplastic 128 that has a thickness that enables the flexible section 108 to bend as the carriage member 100 moves through various locations in a printer. The thermoplastic 128 formed in the flexible sections 108 has a smaller thickness than the thermoplastic 116 formed in the rigid sections 104. In the carriage member 100, the thermoplastic 116 in the rigid sections 104 has a thickness of approximately 2.25 mm while the thermoplastic 128 in the flexible sections 108 is approximately 1 mm thick around the center of each flexible section 108. The thermoplastic 128 tapers from a thicker portion proximate to one of the rigid sections 104 to the thinnest portion at the center of the flexible section 108. The tapered form of the thermoplastic 128 enables the flexible section 108 to bend as the carriage member 100 moves on a curved path.

A plurality of teeth 112 are arranged on both the rigid sections 104 and the flexible sections 108. The teeth 112 are configured to engage a corresponding set of teeth in a gear or other drive mechanism that drives the carriage member. In the flexible sections 108, the tapered thermoplastic 128 curves toward the side of the carriage member 100 having the teeth 112 so that the teeth 112 of both the flexible sections 108 and rigid sections 104 are arranged in a uniform linear manner. In the flexible sections 108, a semi-circular protuberance 132 extends from the back of each of the teeth 112. The protuberances 132 maintain a mesh tolerance between the teeth 112 in the flexible section 108 and corresponding teeth in a gear or other drive member, as described in more detail in FIG. 5. The protuberances 132 increase the thickness of narrow portions of the flexible sections 108 to approximately the same thickness as the rigid sections 104 while still enabling the flexible sections 108 to bend.

The carriage member 100 is arranged in a linear manner with the rigid sections 104 interspersed with the flexible sections 108. Each of the flexible sections 108 is positioned between two rigid sections 104 to enable the carriage member 100 to bend between each adjacent pair of rigid sections 104. In one mode of operation, the carriage member 100 moves between two ends of a track having straight and curved sections. The flexible sections 108 enable the carriage member 100 to bend as the carriage member moves through the curved sections of the track. The rigid sections 104 enable the carriage member to secure printer components to the carriage member 100 as the carriage member 104 moves on the track. A beveled end 136 of the carriage member 100 engages an end of the track to prevent the carriage member from moving beyond an operational range on the track.

The following figures depict an operating environment in a printer that is configured to use the carriage member 100 to move and support printhead maintenance units. The examples illustrated herein depict one use of the carriage member 100, but alternative embodiments employ the carriage member 100 and variants thereof with other components in a printer and in other mechanical devices.

Figure 2:
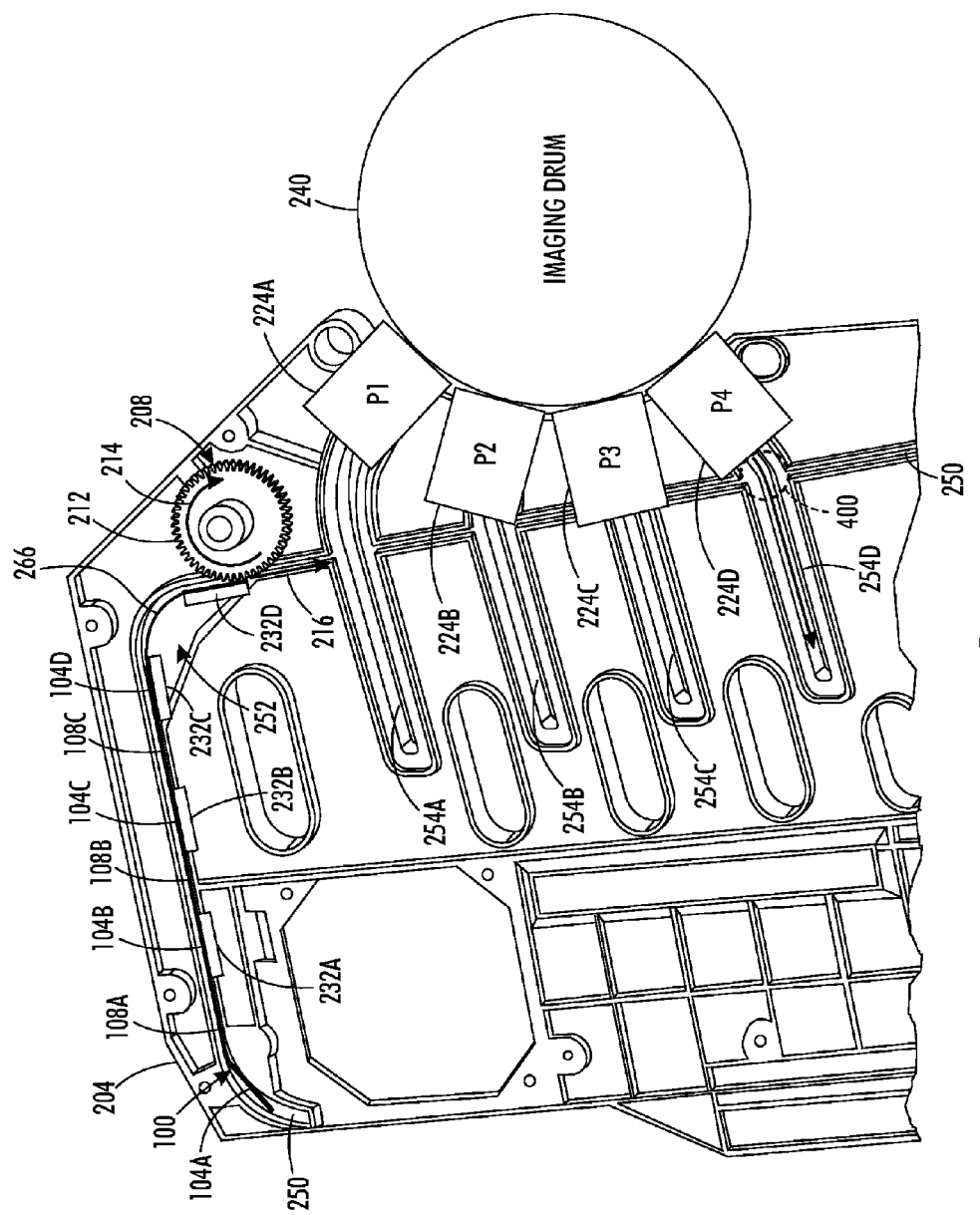
FIG. 2 is a partial cut away view of the gear strap of FIG. 1 configured as a carriage member for a printhead maintenance unit in an inkjet printer.

FIG. 2 depicts an internal view of selected components in an indirect inkjet printer. In the configuration of FIG. 2, a plurality of printheads 224A-224D are positioned to eject ink drops onto an image receiving member, depicted as a cylindrical imaging drum 240. In one embodiment, the four printheads 224A-224D each eject one of a cyan, magenta, yellow, or black ink to form color images on the imaging drum 240. Alternative embodiments include one or more printheads that eject a single color of ink or eject multiple colors of ink from a single printhead. A transfix roller (not shown) is configured to engage the imaging drum 240 to form a nip that enables an ink image on the imaging drum 240 to transfer onto media sheets that pass between the transfix roller and the imaging drum 240.

In the configuration of FIG. 2, a printhead maintenance unit includes printhead maintenance devices 232A-232D that are mechanically coupled to rigid sections 104B-104E, respectively, of the carriage member 100. The carriage member 100 includes rigid sections 100A-100E and flexible sections 108A-108D, although the carriage member 100 is configured with different numbers of flexible and rigid sections in alternate embodiments. In the position of FIG. 2, the rigid section 104E engages a gear 208. The gear 208 includes teeth 212 that mesh with corresponding teeth 112 of the carriage member 100. The carriage member 100 and printhead maintenance devices 232A-232D are configured to move in response to rotation of the gear 208.

Each of the printhead maintenance devices 232A-232D performs maintenance operations on one of the printheads 224A-224D, respectively. Common embodiments of printhead maintenance devices include wipers that wipe excess ink from a printhead face, and ink receptacles that hold ink that is purged from the printhead during a maintenance operation. The carriage member 100 and printhead maintenance devices 232A-232D are depicted in a retracted position in FIG. 2 while the printheads 224A-224D perform imaging operations.

The printheads 224A-224D, carriage member 100, printhead maintenance devices 232A-232D, gear 208, and various other components are held in place on a support plate 204. The support plate 204 is formed as a metal or plastic structure that includes a track 250 for the carriage member 100 and tracks 254A-254D for each of the printheads 224A-224D, respectively. In some embodiments the support plate 204 is formed from multiple members that are joined together while in other embodiments the support plate is a single member such as stamped metal or injection molded plastic. One lateral side of the printheads 224A-224D and the printhead maintenance devices 232A-232D engage the support plate 204. The reader should note that a second support plate with a similar configuration to plate 204 engages a second side of the printheads 224A-224D and that another carriage member 100 engages a second side of the printhead maintenance devices 232A-232D in the second support plate in a printer.

Figure 4:
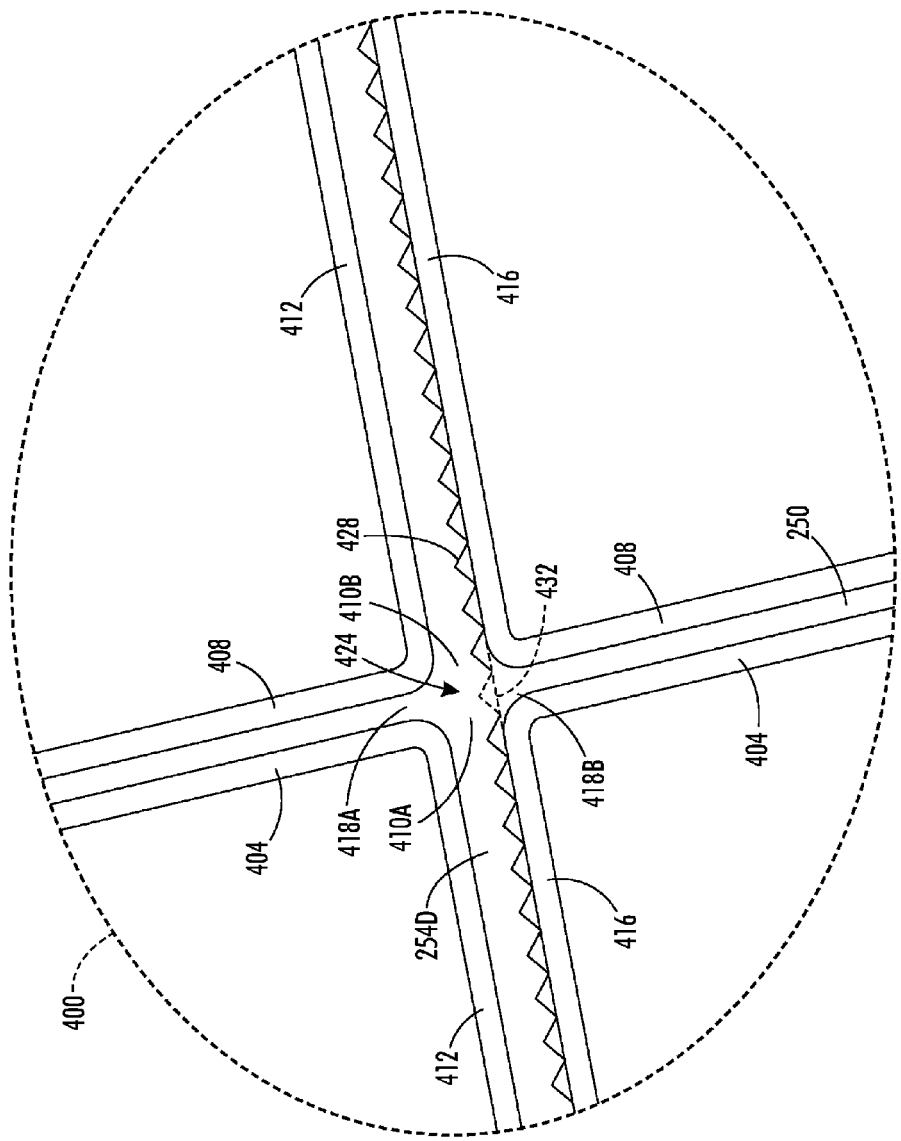
FIG. 4 is a detailed view of two intersecting tracks depicted in FIG. 2.

In the support plate 204, the track 250 extends from one end below the printhead 224D up to the gear 208 and then curves around a ninety degree angle to another end near the top of the support plate 204. The track 250 is formed from two walls that extend from the support plate 204. The carriage member 100 is positioned between the walls, and the configuration of the walls guides the movement of the carriage member 100 in the track 250. FIG. 4 depicts a portion of track 250 in more detail with walls 404 and 408. The walls 404 and 408 extend in parallel for straight portions of length of the track 250, and diverge from parallel in curved portions of the track 250 such as the curved portion 252 (FIG. 2). The walls 404 and 408 diverge in the curved portion 252 with a sufficient radius to enable the rigid sections 104A-104E of the carriage member 100 to move through the curved portion 252 without bending. In the configuration of FIG. 2, the flexible sections 108A and 108D of the carriage member 100 bend to accommodate the curves formed in the track 250. As the carriage member moves in the track 250, each of the flexible sections 108A-108D bend when moving through curved portions of the track 250.

The support plate 204 includes printhead tracks 254A-254D (FIG. 2) that correspond to each of the printheads 224A-224D, respectively. A portion 400 of the track 254D is shown in more detail in FIG. 4. The track 254D is formed from two parallel walls 412 and 416 formed in the support plate 204. In the embodiment of FIG. 4, a plurality of gear teeth 428 extend into the track 254D from the wall 416. The gear teeth 428 engage a drive gear that is coupled to the printhead 224D to enable the printhead 224D to move along the track 254D.

The track 250 for the carriage member 100 and the track 254 for the printhead 224D cross each other at an intersection 424. At the intersection 424, openings 410A and 410B in the walls 404 and 408, respectively, form a gap in the track 250. Openings 418A and 418B in the walls 412 and 416, respectively, form a second gap in the track 254. The length of the openings 410A and 410B in the gap of the track 250 is shorter than a length of one of the rigid sections 104 of the carriage member 100. This length enables each rigid section 104 in the carriage member 104 to span the gap in the track 250 and provide sufficient support for a corresponding printhead maintenance device. The width of the openings 418A and 418B is approximately the width of a single tooth in the gear teeth 428, shown in shadow lines as tooth 432. The single-tooth gap in the printhead track 254 is sufficiently narrow that a corresponding drive gear coupled to a printhead can move through the intersection 424 along the track 254 without interruption.

Figure 3:
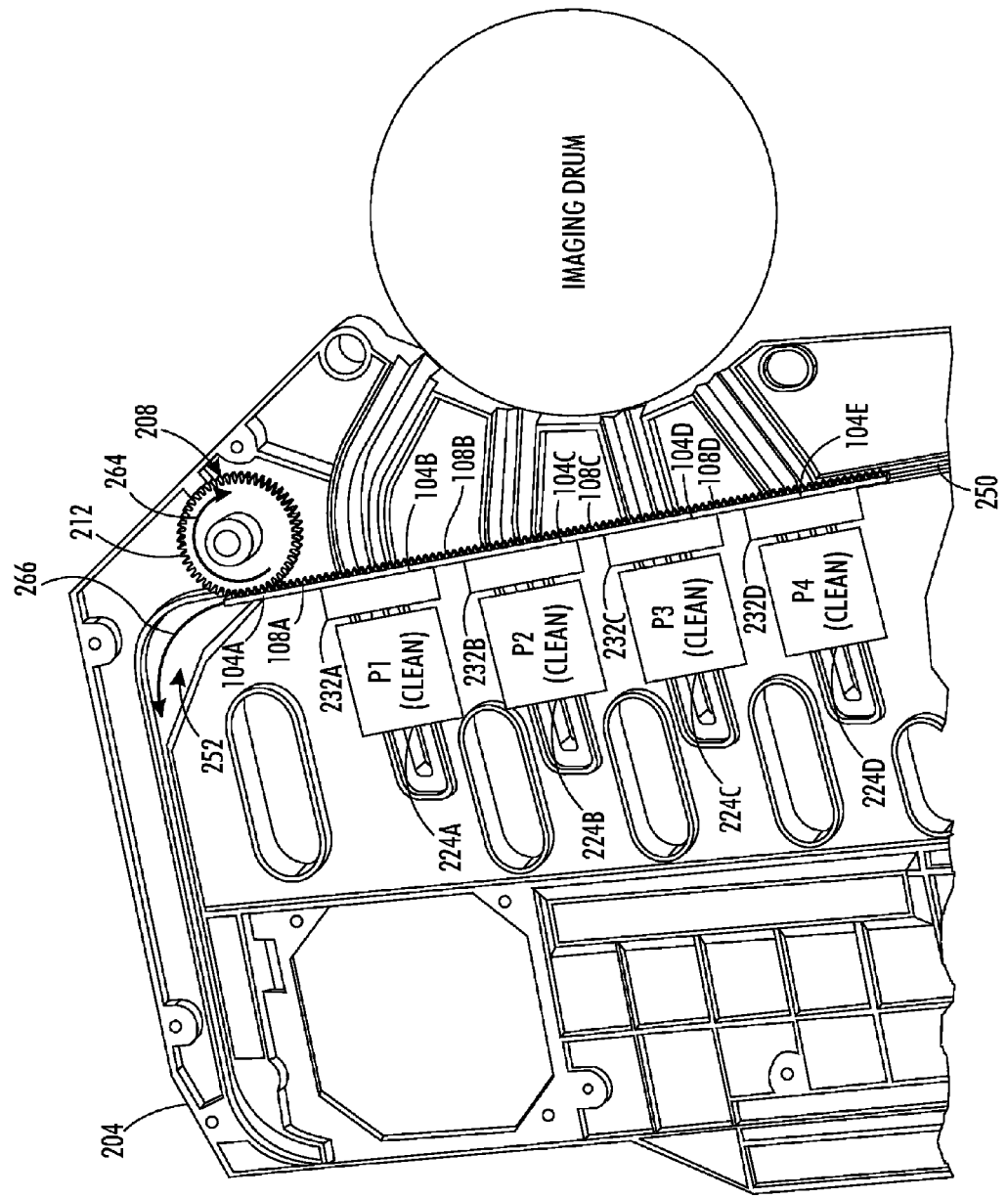
FIG. 3 is another partial cut away view of the gear strap of FIG. 1 during a printhead maintenance process in the printer.

During a maintenance operation, the printer changes from the configuration of FIG. 2 to the configuration of FIG. 3. First, the printheads 224A-224D move along the corresponding tracks 254A-254D from the position in FIG. 2 to the maintenance position depicted in FIG. 3. After the printheads 224A-224D are moved to the maintenance position, the gear 208 rotates in direction 214 and the carriage member 100 moves in direction 216 down the track 250. The printhead maintenance devices 232A-232D move with the carriage member 100 to the position depicted in FIG. 3.

FIG. 3 depicts the support plate 204 of FIG. 2 with the printheads 224A-224D and printhead maintenance devices 232A-232D configured to perform a printhead maintenance operation. Each of the printhead maintenance devices 232A-232D is positioned proximate to the face of a corresponding printhead 224A-224D, respectively. The rigid sections 104B-104E of the carriage member 100 are each positioned across an intersection of one of the printhead tracks 254A-254D and the carriage member track 250. The rigid sections 104B-104E reduce or eliminate movement of the printhead maintenance units 232A-232D during wiping or other mechanically intensive maintenance operations. The rigid section 104A is not mechanically coupled to a printhead maintenance device, but teeth 112 formed on the rigid section remain engaged to the teeth 212 of the gear 208 during the maintenance process.

At the conclusion of the maintenance process, the gear 208 rotates in direction 264. The gear 208 engages the rigid section 104A of the carriage member 100, and the rotation of the gear 208 moves the carriage member in direction 266. The carriage member 100 and printhead maintenance devices 232A-232D move on the track 250 in the direction 266 to return to the configuration depicted in FIG. 2. The printheads 224A-224D then move on tracks 254A-254D, respectively, to return to the configuration of FIG. 2.

The teeth 112 in the flexible sections 108 of the carriage member 100 engage the teeth 212 in the drive gear 208 as the carriage member moves between the positions of FIG. 2 and FIG. 3. As the flexible sections 108 in the gear strap engage the gear 208, the gear 208 applies a mechanical force to the flexible sections in the gear strap that can bend the flexible sections 108 and urge the teeth 112 in the carriage member 100 out of engagement with the teeth 212 in the gear 208, which leads to slipping.

Figure 5:
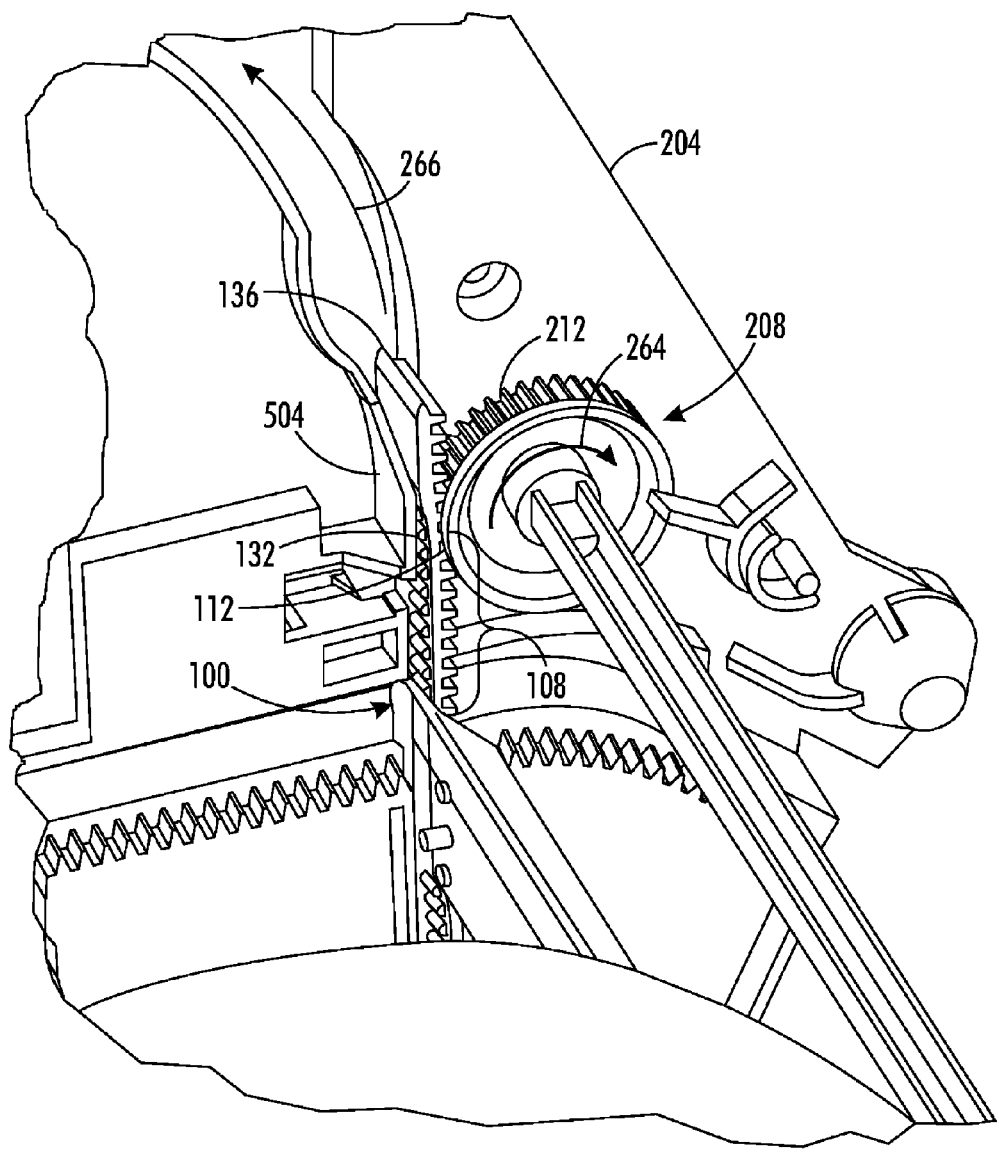
FIG. 5 is a detailed view of the gear strap engaged to a drive gear as depicted in FIG. 3.

As depicted in FIG. 5, the protuberances 132 in each of the flexible sections 108 engage a support member 504 that extends from the support plate 204 to reduce or eliminate slipping between the flexible sections 108 and the gear 208. In FIG. 5, the teeth 112 in one of the flexible sections 108 of the carriage member 100 engage the teeth 212 in the gear 208. As each of the flexible sections 108 in the carriage member 100 engage the gear 208, corresponding protuberances 132 engage the support member 504. The support member 504 prevents the flexible sections 108 from bending by supporting the flexible sections 108 through the protuberances 132 as each flexible section 108 engages the gear 208. Thus, the protuberances 132 and the support member 504 enable the teeth 112 in each of the flexible sections 108 of the carriage member 100 to remain engaged to the teeth 212 in the gear 208 within a tolerance that reduces or eliminates slipping between the gear 208 and the carriage member 100.

Variants of the above-disclosed and other features and functions, or alternatives thereof, may be combined into many other different apparatuses, applications or methods. For example, while the carriage member 100 is depicted in use with an indirect inkjet printer, alternative printer embodiments including direct inkjet printers also use the carriage member 100. Various presently unforeseen or unanticipated alternatives, modifications, variations or improvements therein may be subsequently made by those skilled in the art and are intended to be encompassed by the following claims.

We claim:

1. A printing apparatus comprising:
   a support plate;
   a track positioned in the support plate, the track having a first wall and a second wall;
   a gear positioned on the support plate proximate to one side of the track; and
   a gear strap positioned in the track between the first wall and the second wall, the gear strap further comprising:
      a continuous strip having a plurality of rigid sections interspersed with a plurality of flexible sections, each of the rigid sections and each of the flexible sections consisting essentially of one material, the rigid sections being thicker in cross-section than the flexible sections to enable the flexible sections to bend;
      a plurality of teeth formed on each rigid section and a plurality of teeth formed on each flexible section of the continuous strip, the pluralities of teeth being configured to engage the gear to enable rotation of the gear to move the continuous strip in the track; and at least one engagement member extending from one of the plurality of rigid sections of the strip, the engagement member being configured to receive a coupling member to enable the one rigid section to move the coupling member in response to movement of the continuous strip.

2. The printing apparatus of claim 1, each flexible section of the continuous strip having a curved shape to urge the plurality of teeth formed on each of the flexible sections into engagement with the gear.

3. The printing apparatus of claim 1, the plurality of rigid sections and the plurality of flexible sections in the strip being formed in a linear configuration.

4. The printing apparatus of claim 3, each rigid section in the plurality of rigid sections in the strip being formed adjacent to at least one flexible section in the plurality of flexible sections in the strip.

5. The printing apparatus of claim 1, each of the flexible sections in the strip further comprising:

a plurality of protuberances to enable gear mesh tolerance.

6. The printing apparatus of claim 1 further comprising:

a gap formed in the first wall and the second wall in the track, each rigid section in the plurality of rigid sections in the strip having a length that is longer than a length of the gap.

7. The printing apparatus of claim 6, the gear strap being configured to move between a first position in the track to a second position in the track in response to rotation of the gear.

8. The printing apparatus of claim 7, one of the rigid sections being positioned across the gap in the track when the gear strap is in the first position.

9. The printing apparatus of claim 6 further comprising:

a second track positioned in the support plate and extending across the track at an intersection through the gap in the track, the second track having a third wall and a fourth wall arranged in parallel with a second gap formed through the third wall and fourth wall at the intersection through the gap in the track, the second track enabling a printhead carriage to move from a first location in the second track through the intersection to a second location in the second track.

10. The printing apparatus of claim 9 further comprising:

a second plurality of teeth formed on the third wall of the second track and configured to engage the printhead carriage, the second gap having a width that corresponds to a width of one tooth in the second plurality of teeth.

11. The printing apparatus of claim 1, the track further comprising a curved portion, each flexible section in the plurality of flexible sections of the strip being configured to bend to enable the gear strap to move through the curved portion of the track.

12. The printing apparatus of claim 1, the strip consisting essentially of a thermoplastic polymer material.

13. The printing apparatus of claim 12, the thermoplastic polymer material consisting essentially of polypropylene.

* * * * *